(12) United States Patent
Habibi

(10) Patent No.: US 9,664,579 B2
(45) Date of Patent: May 30, 2017

(54) PRESSURE SENSOR MODULE

(71) Applicant: Robert Bosch GmbH, Stuttgart (DE)

(72) Inventor: Masoud Habibi, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 111 days.

(21) Appl. No.: 14/649,036

(22) PCT Filed: Oct. 4, 2013

(86) PCT No.: PCT/EP2013/070682
§ 371 (c)(1),
(2) Date: Jun. 2, 2015

(87) PCT Pub. No.: WO2014/086512
PCT Pub. Date: Jun. 12, 2014

(65) Prior Publication Data
US 2015/0346045 A1 Dec. 3, 2015

(30) Foreign Application Priority Data

Dec. 3, 2012 (DE) .................. 10 2012 222 089

(51) Int. Cl.
G01L 19/14 (2006.01)
G01L 19/00 (2006.01)
G01L 9/08 (2006.01)
G01L 9/00 (2006.01)
G01L 9/06 (2006.01)

(52) U.S. Cl.
CPC ........ *G01L 19/0069* (2013.01); *G01L 9/0052* (2013.01); *G01L 9/06* (2013.01); *G01L 19/14* (2013.01); *G01L 19/143* (2013.01)

(58) Field of Classification Search
CPC ..... G01L 19/14; G01L 19/00; G01L 19/0069; G01L 19/143; G01L 9/00; G01L 9/08; G01L 9/06; G01L 9/0052
See application file for complete search history.

(56) References Cited

U.S. PATENT DOCUMENTS

| 6,055,864 A * | 5/2000 | Stiller ................. G01L 19/0084 73/718 |
| 2002/0184955 A1* | 12/2002 | Parker .................. G01L 9/0051 73/756 |
| 2006/0000288 A1 | 1/2006 | Pham et al. |

(Continued)

FOREIGN PATENT DOCUMENTS

| DE | 100 14 992 | 10/2001 |
| DE | 10 15 405 | 1/2004 |

(Continued)

Primary Examiner — Nguyen Ha
(74) Attorney, Agent, or Firm — Gerard Messina

(57) ABSTRACT

A pressure sensor module is described for determining the pressure of a measurement medium, and includes a sensor chip, a housing having a pressure connector, and a plug part for the electrical connection of the pressure sensor module. In addition, plug contacts that are electrically connected to the sensor chip are provided in the plug part. In addition, in the provided pressure sensor module it is provided that the sensor chip is capable of being loaded with the measurement medium through the pressure connector, and the pressure connector is made at least partly of a light metal.

13 Claims, 1 Drawing Sheet

(56) References Cited

U.S. PATENT DOCUMENTS

| | | | |
|---|---|---|---|
| 2007/0220989 A1* | 9/2007 | Uchigashima | G01L 9/0042 73/756 |
| 2008/0202250 A1* | 8/2008 | Koehler | G01L 19/147 73/756 |
| 2010/0089199 A1 | 4/2010 | Koehler et al. | |
| 2011/0296927 A1* | 12/2011 | Hopman | G01L 9/0075 73/723 |
| 2013/0098160 A1* | 4/2013 | Rozgo | G01L 9/0041 73/723 |
| 2015/0217416 A1* | 8/2015 | Nguyen | B23P 11/005 29/451 |

FOREIGN PATENT DOCUMENTS

| | | |
|---|---|---|
| DE | 60 2005 002859 | 2/2008 |
| DE | 20 2008 011684 | 12/2008 |
| EP | 1 505 380 | 2/2005 |
| JP | S58 731 | 1/1983 |

\* cited by examiner

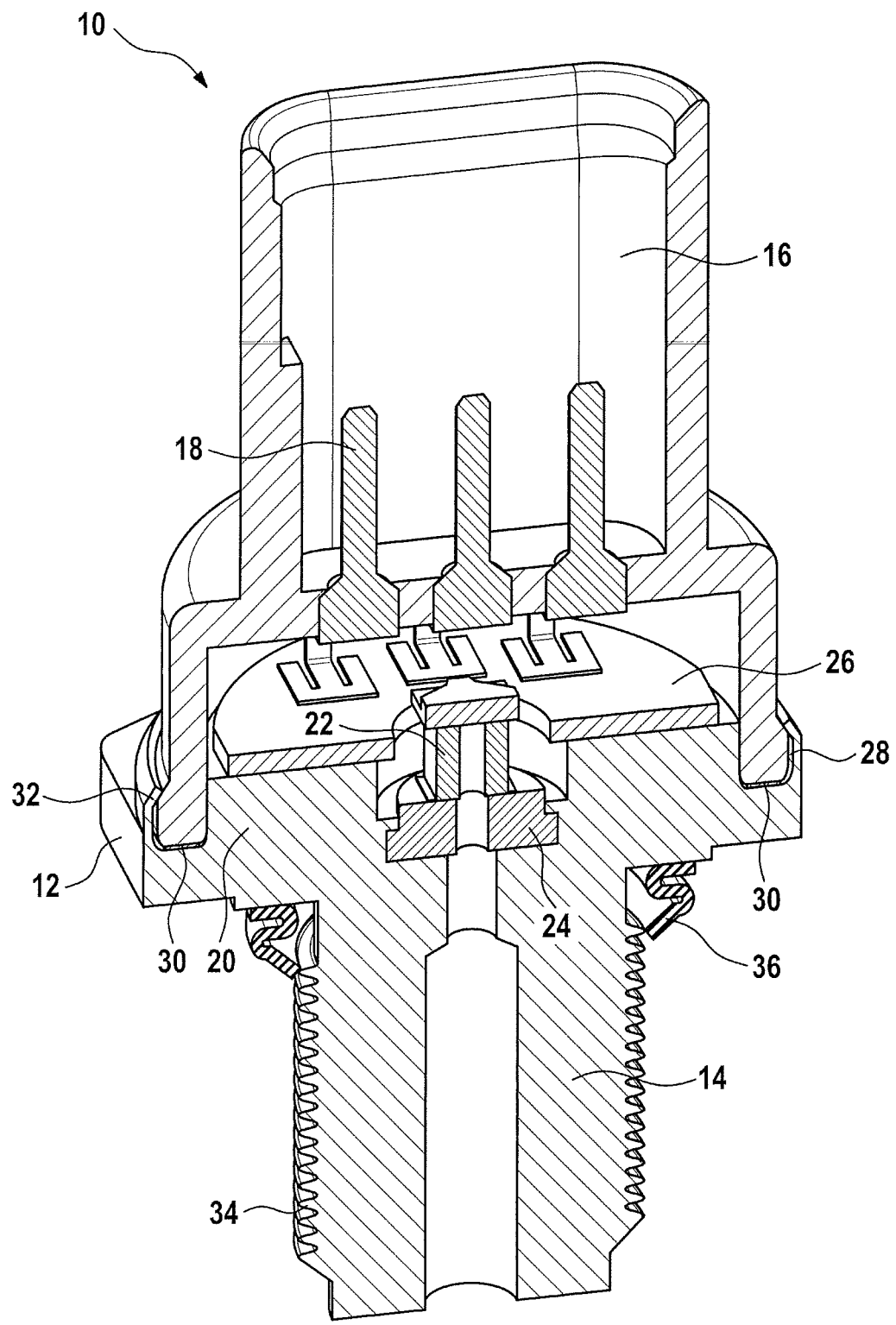

PRESSURE SENSOR MODULE

FIELD OF THE INVENTION

The present invention relates to a pressure sensor module.

BACKGROUND INFORMATION

A similar pressure sensor is discussed for example in DE 103 15 405 A1. In this document, for example a pressure sensor is discussed having a pressure pickup situated in a housing, the housing having a first housing part provided with a pressure connecting collar, and having a second housing part provided with a plug part. Between the first housing part and the second housing part there is situated a connecting part that is fashioned as a stamped flexible part and that forms, with the first sensor housing part, an electromagnetic compatibility space that is sealed except for openings for routing through the electrical terminals. The pressure pickup is contacted to a circuit board that in turn is connected to terminal elements of the plug part via S-shaped connecting elements.

In addition, DE 100 14 992 A1, a sensor system discusses a pressure measurement cell that has a measurement membrane that can be deflected by the pressurized measurement medium and that has a measurement bridge. An evaluation circuit is fashioned as a hybrid circuit and is fastened directly on the measurement membrane, producing electrical connections between the hybrid circuit and the measurement bridge. The contacting of the hybrid circuit to plug pins of a plug part of the sensor system takes place via spring contacts inside the sensor housing.

SUMMARY OF THE INVENTION

Therefore, a pressure sensor module is proposed for determining the pressure of a medium that further develops the existing art described above in an advantageous manner.

Correspondingly, a pressure sensor module is proposed that has a sensor chip, a housing having a pressure connector, and a plug part for the electrical connection of the pressure sensor module. In general, a sensor chip is a component that can be used to convert a physical measurement quantity, such as the pressure of a medium, which may be into a electrical current, or further which may be an electrical voltage. In other words, the sensor chip produces, as a function of a pressure exerted on it, a corresponding electrical output signal in the form of a voltage or a current that is a function of the pressure. In this regard, in the pressure sensor module according to the present invention it is further provided that in the plug part there are provided plug contacts that are electrically connected to the sensor chip, which contacts are for example capable of conducting the electrical voltage or the electrical current provided by the sensor chip as output signal via electrical conductors, which for example are not part of the pressure sensor module, to for example a control device, thus enabling a reading out of the sensor chip. According to the present invention, the sensor chip can be loaded with the measurement medium through the pressure connector, the pressure connector being made at least in part of a light metal.

The manufacture of at least the pressure connector from a light metal has first of all the advantage that, in contrast to other materials used up to now, such as-grade steel, the material costs can advantageously be reduced already during the acquisition of the raw material. A further advantage of the proposed pressure sensor module is that through the use of a light metal the weight of the sensor module can in addition advantageously be reduced.

The pressure connector may be made of aluminum or brass. In a likewise advantageous manner, it is also possible to produce the pressure connector from an aluminum alloy or a brass alloy, or some other light metal alloy.

In addition, it is advantageously possible in the production of the proposed pressure sensor module, in particular of the housing and of the pressure connector of the sensor module, to further reduce the costs, in particular of the required shaping processes. For example, here a housing, and/or the pressure connector of the pressure sensor module, can be produced as an extruded part, if it is made of aluminum.

According to a further specific embodiment of the proposed pressure sensor module, it can be provided that the housing has a housing body that is made in one piece from the light metal, together with the pressure connector, and that further accommodates the sensor chip. The pressure connector may be intended to be introduced into a space that conducts the measurement medium, and to enable a connection for the measurement medium inside the space to the sensor chip, in particular for the immediate loading of the sensor chip with the measurement medium. For general production-related reasons, and also for simpler installation, the pressure connector may have a rotationally symmetrical shape, such as for example that of a hollow cylinder. However, any other shape is also conceivable.

In addition, by producing the housing, in particular the housing body and the pressure connector, as a one-piece component made of a light metal, the advantage is obtained that in particular in the region of the housing that conducts the measurement medium under pressure, a structure made up of a plurality of housing parts, and correspondingly required points of connection of the housing parts, can be avoided, or may be omitted. This is in particular because especially high requirements of tightness arise at such points of connection loaded with the pressurized measurement medium. Consequently, through a one-piece realization of the housing body and of the pressure connector, a weak point, in the form of points of connection and the associated falsification of the measurement results that occur in the case of a leak, is avoided. In addition, it can be provided that at the side of the housing body facing away from the pressure connector a circuit bearer is provided that can for example be set up to provide the electrical connection between the sensor chip and the plug contacts. In addition, however, the circuit bearer can also be provided so as to provide an evaluation electronics system that first prepares the output signal generated by the sensor chip, for example using a filter and/or a current or voltage amplifier, and if necessary also partially or completely evaluates it. In this regard, the evaluation electronics can also be set up to provide the above-described at least partly evaluated output signal of the sensor chip to the plug contacts in analog or digital form, for example for reading out by a sensor control device. For this purpose, the circuit bearer can for example be formed by a known circuit board that has at least one layer of electrical circuits and/or electrical connections.

Alternatively or in addition, it can be provided that the sensor chip is a piezoresistive sensor chip. As is known, a piezoresistive sensor chip is distinguished by the properties of its material, which modify the inherent electrical resistance as a function of pressure or tension exerted thereon. This change in the electrical resistance of the sensor chip can be easily and reliably acquired using external circuitry, through a known current-voltage measurement or voltage-current measurement.

A further specific embodiment of the proposed pressure sensor module has a plug part that is made at least partly of a plastic. Because the plug part is not intended to come into contact with the pressurized measurement medium, it can likewise advantageously be produced as a mass-produced product, for example using a plastic injection molding method, which further reduces costs. The plug part is used in particular to protect the plug contacts, provided for further electrical connection, from mechanical impairment, such as bending of the individual plug contacts, and in addition to prevent a plug that may be plugged onto the plug contacts against undesired withdrawal from the plug contacts.

In addition, it can in particular be advantageous if the plug part is connected to the housing so as to be rotationally secured and non-detachable.

It can also advantageously be provided that the plug part is connected to the housing with a positive and/or non-positive connection. In this way, a permanent and stable connection is ensured between the plug part and the housing. Here it is also advantageous if the positive connection includes a clamp connection, in particular a crimping. This crimping can for example be produced by a groove formed in the housing body and, after inserting the plug part into this groove, a squeezing and/or pressing of the outer groove edge. This is advantageously promoted through the use of an easily deformable light metal, such as aluminum.

In the case of a non-positive connection of the plug part to the housing, it can be provided that the non-positive connection is brought about by a glued connection, in particular using an adhesive applied on the housing body. In this way, the plug part can easily be connected to the housing body and subsequently may be held permanently thereon. Also advantageously, it can likewise be provided that both a positive connection in the form of a crimping and also a non-positive connection through the use of an adhesive connection are carried out.

According to a further embodiment of the pressure sensor module, it is proposed that a seal, which may be an annular seal, is provided on the housing, in particular in the area of the transition from the housing body to the pressure heads. The seal can for example be a profiled rubber lip, or an O-ring made of rubber. However, a seal is also possible provided by a profiled brass ring that swages when the pressure sensor module is drawn on relative to the housing wall into which the pressure sensor module is screwed, bringing about a sealing effect through deformation. In addition, for further improvement of the tightness, a film-type seal can be situated on outer threading 34.

In addition, it can be provided that the sensor chip of the pressure module is held by an intermediate bearer, the intermediate bearer being connected to the housing by a positive and/or non-positive connection. The intermediate bearer may be made of an iron-nickel-cobalt alloy or comparable material having a low thermal coefficient of expansion. A Kovar® bearer can again be used here. It is also advantageous here if the positive connection between the intermediate bearer and the housing includes a clamp connection produced by a deformation of the housing material, for example crimping. Here it is possible that the deformed housing material, forming a projection, works together with an edge that may be provided on the intermediate bearer in order to form the clamping effect. Here, the use and the production of a clamp connection is again aided by the use of for example aluminum or brass as the material of the housing, in particular of the housing body. In addition, in this way expensive welding processes are avoided.

In addition, it can be advantageous if the positive and/or non-positive connection between the intermediate bearer and the housing is pressure-tight. This is in particular advantageous because any escape of the pressurized measurement medium from the pressure connector or from the housing body in a region of the housing with ambient pressure would reduce the pressure inside the pressure connector and would thus unintentionally distort the measurement result. In addition, leakage of the measurement medium into the region of the housing having ambient pressure can cause failure of the sensor due to corrosion.

A specific embodiment of a pressure sensor module according to the present invention is shown in the drawing and is explained in more detail in the following description.

BRIEF DESCRIPTION OF THE DRAWINGS

The FIGURE shows an exemplary embodiment of the pressure sensor module according to the present invention having a pressure connector made of a light metal.

DETAILED DESCRIPTION

FIG. 1 shows a pressure sensor module 10 for determining the pressure of a measurement medium, having a housing 12 having a pressure connector 14, and further having a plug part 16. As is shown in FIG. 1, inside plug part 16 there are three plug contacts 18 for the electrical connection of the pressure sensor module to, for example, a control device (not shown) or a data bus (also not shown). However, the number of plug contacts provided can, in the individual case, differ in particular from the embodiment shown. Housing 12 has a housing body 20 that may be provided with an outer profile in the shape of a hexagon. Pressure connector 14 goes out from the side of housing body 20 oriented away from plug part 16. In addition, FIG. 1 shows that inside housing body 20 a sensor chip 22 is held in housing body 20 by an intermediate bearer 24. As is also shown, pressure connector 14, intermediate bearer 24, and sensor chip 22 have a hollow space, which may be in the form of a continuous bore, that makes it possible for the pressurized medium to pass through pressure connector 14 and intermediate bearer 24 up to sensor chip 22. Intermediate bearer 24 may be situated in a recess (not further designated) inside housing body 20, and held there by a clamp connection. The clamp connection may be produced, with formation of a projection, by a deformation of the housing material of the housing body in an edge region of the recess.

In addition, on the side of housing body 20 situated opposite pressure connector 14 there is situated a circuit bearer 26 that is connected in electrically conductive fashion to sensor chip 22, e.g. by bonding wires, and that enables an evaluation of sensor chip 22. The circuit bearer can contain components such as capacitors in order to improve the electromagnetic compatibility. In addition, circuit bearer 26 may be connected in electrically conductive fashion to plug contacts 18. As shown, plug part 16 may be fitted into a groove 28 inside housing body 20, and held on the one hand by a layer, situated inside the groove, of adhesive 30, and by a clamp connection 32 produced in the region of the outer circumferential surface of groove 28. Adhesive connection 30 and clamp connection 32 may create a permanent and non-detachable connection between plug part 16 and housing body 20, which additionally protects plug part 16 against undesired rotation relative to housing body 20.

In addition, FIG. 1 shows that the specific embodiment of the pressure sensor module may have a rotationally symmetrical pressure connector 14, on whose circumferential surface there is formed an outer threading 34 in order to make it possible to screw the pressure sensor module into what may be a corresponding inner threading that is provided for example in the wall of a pipe that conducts the measurement medium. In order to continue to ensure the tightness of this pipe (not shown) in the region of the described pass-through opening having the inner threading with pressure connector 14, the specific embodiment of pressure sensor module 10 has, in the area of the transition from pressure connector 14 to housing body 20, a seal 36 which seals the pass-through opening (not shown) in pressure-tight fashion after pressure sensor module 10 is screwed in. In addition, in order to further improve the tightness a film-type seal can be situated on outer threading 34.

What is claimed is:

1. A pressure sensor module for determining a pressure of a measurement medium, comprising:
    a sensor chip;
    a housing having a pressure connector; and
    a plug part for an electrical connection of the pressure sensor module, wherein plug contacts electrically connected to the sensor chip are provided in the plug part, the sensor chip is capable of being loaded with the measurement medium through the pressure connector, and the pressure connector is made at least partly of a light metal, and
    wherein the sensor chip is held by an intermediate bearer, the intermediate bearer being connected to the housing by at least one of: a positive connection and a non-positive connection.

2. The pressure sensor module of claim 1, wherein the pressure connector is made of aluminum or of an aluminum alloy.

3. The pressure sensor module of claim 1, wherein the housing has a housing body, the housing body and the pressure connector are made in one piece from the light metal, and the housing body accommodates the sensor chip.

4. The pressure sensor module of claim 1, wherein a circuit bearer is provided on the side of the housing body oriented away from the pressure connector.

5. The pressure sensor module of claim 1, wherein the sensor chip is a piezoresistive sensor chip.

6. The pressure sensor module of claim 1, wherein the plug part is made at least partly of a plastic.

7. The pressure sensor module of claim 1, wherein the plug part is connected to the housing in rotationally fixed and non-detachable fashion.

8. The pressure sensor module of claim 1, wherein the plug part is connected to the housing by a positive and/or non-positive connection.

9. The pressure sensor module of claim 1, wherein a seal is provided on the housing.

10. The pressure sensor module of claim 1, wherein the positive connection includes a clamp connection, and the clamp connection is produced by a deformation of the housing material.

11. The pressure sensor module of claim 1, wherein the pressure connector, intermediate bearer, and sensor chip form a continuous bore to enable the medium to pass through the pressure connector and the intermediate bearer to the sensor chip.

12. The pressure sensor module of claim 1, wherein the light metal includes at least one of: aluminum, an aluminum alloy, brass, and brass alloy.

13. The pressure sensor module of claim 1, wherein the light metal includes at least one of: brass and a brass alloy.

* * * * *